(12) United States Patent
Sanchez

(10) Patent No.: US 10,571,062 B2
(45) Date of Patent: Feb. 25, 2020

(54) MIDDLE THREADED FITTING

(71) Applicant: UNITED TECHNOLOGIES CORPORATION, Farmington, CT (US)

(72) Inventor: Christopher A. Sanchez, Charlton, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 298 days.

(21) Appl. No.: 15/631,809

(22) Filed: Jun. 23, 2017

(65) Prior Publication Data

US 2018/0372255 A1 Dec. 27, 2018

(51) Int. Cl.
| F16L 39/00 | (2006.01) |
| F01D 5/18 | (2006.01) |
| F02C 7/22 | (2006.01) |
| F16L 9/19 | (2006.01) |
| F23R 3/28 | (2006.01) |
| F02C 7/055 | (2006.01) |
| F23R 3/00 | (2006.01) |

(52) U.S. Cl.
CPC .............. *F16L 39/005* (2013.01); *F01D 5/18* (2013.01); *F02C 7/22* (2013.01); *F16L 9/20* (2013.01); *F23R 3/283* (2013.01); *F02C 7/055* (2013.01); *F16L 2201/30* (2013.01); *F16N 2210/02* (2013.01); *F23R 3/002* (2013.01)

(58) Field of Classification Search
CPC ......... F16L 9/18; F16L 37/2445; F16L 39/00; F16L 39/005; E21B 17/18; E21B 33/04
See application file for complete search history.

(56) References Cited

U.S. PATENT DOCUMENTS

| 4,579,373 A | 4/1986 | Neal et al. |
| 8,991,871 B2 | 3/2015 | Weinhold |
| 2012/0217739 A1* | 8/2012 | Weinhold .............. F16L 23/024 285/121.2 |
| 2013/0049355 A1* | 2/2013 | Weinhold .............. F16L 3/1222 285/123.16 |
| 2013/0181439 A1 | 7/2013 | Alhaug |
| 2015/0152786 A1* | 6/2015 | Milne ..................... F01D 9/065 60/39.08 |

FOREIGN PATENT DOCUMENTS

| CN | 201074707 | 6/2008 |
| CN | 203374213 | 1/2014 |
| EP | 2957804 | 12/2015 |
| EP | 3051198 | 8/2016 |

OTHER PUBLICATIONS

European Patent Office, European Search Report dated Oct. 18, 2018 in Application No. 18176421.8.

* cited by examiner

*Primary Examiner* — Scott J Walthour
*Assistant Examiner* — Colin J Paulauskas
(74) *Attorney, Agent, or Firm* — Snell & Wilmer LLP

(57) ABSTRACT

A fitting for forming a double-walled tube includes an inner fitting having a first inner weld lip, a second inner weld lip, and an inner body extending from the first inner weld lip to the second inner weld lip and having an outer surface with a first threading. The fitting also includes an outer fitting having a first outer weld lip, a second outer weld lip, and an outer body extending from the first outer weld lip to the second outer weld lip and having an inner surface with a second threading that is configured to mate with the first threading.

5 Claims, 6 Drawing Sheets

MIDDLE THREADED FITTING

FIELD

The present disclosure is directed to a double-walled tube and, more particularly, to a fitting having multiple pieces for forming a double-walled tube.

BACKGROUND

Gas turbine engines include a compressor section for compressing air, a combustor section for mixing the compressed air with fuel and combusting the mixture to generate exhaust, and a turbine section for converting the exhaust into torque. Portions of the compressor section, the combustor section, and the turbine section may include parts that move relative to adjacent parts. In that regard, it is desirable to provide lubrication to many of these locations. Double-walled tubes may be utilized throughout gas turbine engines to transport a lubricating fluid, such as oil. The inner tube may transport the fluid, and a passageway between the inner tube and the outer tube may collect and transport fluid that leaks from the inner tube to reduce the likelihood of the lubrication flowing freely within the gas turbine engine.

SUMMARY

Disclosed herein is a fitting for forming a double-walled tube. The fitting includes an inner fitting having a first inner weld lip, a second inner weld lip, and an inner body extending from the first inner weld lip to the second inner weld lip and having an outer surface with a first threading. The fitting also includes an outer fitting having a first outer weld lip, a second outer weld lip, and an outer body extending from the first outer weld lip to the second outer weld lip and having an inner surface with a second threading that is configured to mate with the first threading.

In any of the foregoing embodiments, the inner fitting further includes at least two bump-outs extending outward from the inner body, and the outer surface with the first threading is positioned on an outer surface of the at least two bump-outs.

In any of the foregoing embodiments, a channel is defined between the at least two bump-outs when the inner fitting is mated with the outer fitting to allow fluid to flow between the inner body and the outer body.

In any of the foregoing embodiments, the at least two bump-outs includes three bump-outs.

In any of the foregoing embodiments, the outer fitting further includes an outward-extending protrusion having at least one angle configured to interface with a tool for fastening the outer fitting to the inner fitting.

In any of the foregoing embodiments, the outward-extending protrusion has a shape that corresponds to a portion of a hexagon.

In any of the foregoing embodiments, a length of the inner fitting from the first inner weld lip to the second inner weld lip is less than a length of the outer fitting from the first outer weld lip to the second outer weld lip.

Also described is a double-walled tube. The double-walled tube includes an inner tube having a first inner tube, a second inner tube, and an inner fitting having a first inner weld lip configured to be welded to the first inner tube, a second inner weld lip configured to be welded to the second inner tube, and an inner body extending from the first inner weld lip to the second inner weld lip and having an outer surface with a first threading. The double-walled tube further includes an outer tube having a first outer tube, a second outer tube, and an outer fitting having a first outer weld lip configured to be welded to the first outer tube, a second outer weld lip configured to be welded to the second outer tube, and an outer body extending from the first outer weld lip to the second outer weld lip and having an inner surface with a second threading that is configured to mate with the first threading.

In any of the foregoing embodiments, the inner fitting further includes at least two bump-outs extending outward from the inner body, and the outer surface with the first threading is positioned on an outer surface of the at least two bump-outs.

In any of the foregoing embodiments, a channel is defined between the at least two bump-outs when the inner fitting is mated with the outer fitting to allow fluid to flow between the inner body and the outer body.

In any of the foregoing embodiments, the inner tube is configured to transport the fluid and the channel is configured to allow leakage fluid from the inner tube to pass between the outer fitting and the inner fitting.

In any of the foregoing embodiments, the at least two bump-outs includes three bump-outs.

In any of the foregoing embodiments, the outer fitting further includes an outward-extending protrusion having at least one angle configured to interface with a tool for fastening the outer fitting to the inner fitting.

In any of the foregoing embodiments, the outward-extending protrusion has a shape that corresponds to a portion of a hexagon.

In any of the foregoing embodiments, a length of the inner fitting from the first inner weld lip to the second inner weld lip is less than a length of the outer fitting from the first outer weld lip to the second outer weld lip.

Also described is a gas turbine engine. The gas turbine engine includes a compressor section configured to compress air. The gas turbine engine also includes a combustor configured to receive compressed air from the compressor section and fuel and ignite the compressed air and the fuel to generate exhaust. The gas turbine engine also includes a turbine section configured to convert the exhaust into torque. The gas turbine engine also includes a double-walled tube configured to transport fluid through a portion of at least one of the compressor section or the turbine section. The double-walled tube includes an inner tube having a first inner tube, a second inner tube, and an inner fitting having a first inner weld lip welded to the first inner tube, a second inner weld lip welded to the second inner tube, and an inner body extending from the first inner weld lip to the second inner weld lip and having an outer surface with a first threading. The double-walled tube also includes an outer tube having a first outer tube, a second outer tube, and an outer fitting having a first outer weld lip welded to the first outer tube, a second outer weld lip welded to the second outer tube, and an outer body extending from the first outer weld lip to the second outer weld lip and having an inner surface with a second threading that is configured to mate with the first threading.

In any of the foregoing embodiments, the inner fitting further includes at least two bump-outs extending outward from the inner body, a channel is defined between the at least two bump-outs to allow the fluid to flow between the inner body and the outer body, and the outer surface with the first threading is positioned on an outer surface of the at least two bump-outs.

In any of the foregoing embodiments, the inner tube is configured to transport the fluid and the channel is configured to allow leakage fluid from the inner tube to pass between the inner fitting and the outer fitting.

In any of the foregoing embodiments, the outer fitting further includes an outward-extending protrusion having a shape that corresponds to a portion of a hexagon and is configured to interface with a wrench for fastening the outer fitting to the inner fitting.

In any of the foregoing embodiments, a length of the inner fitting from the first inner weld lip to the second inner weld lip is less than a length of the outer fitting from the first outer weld lip to the second outer weld lip.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the central longitudinal axis of a turbine engine. As used herein, "radially inward" refers to the direction generally towards the central longitudinal axis of the turbine engine.

Figure 1:
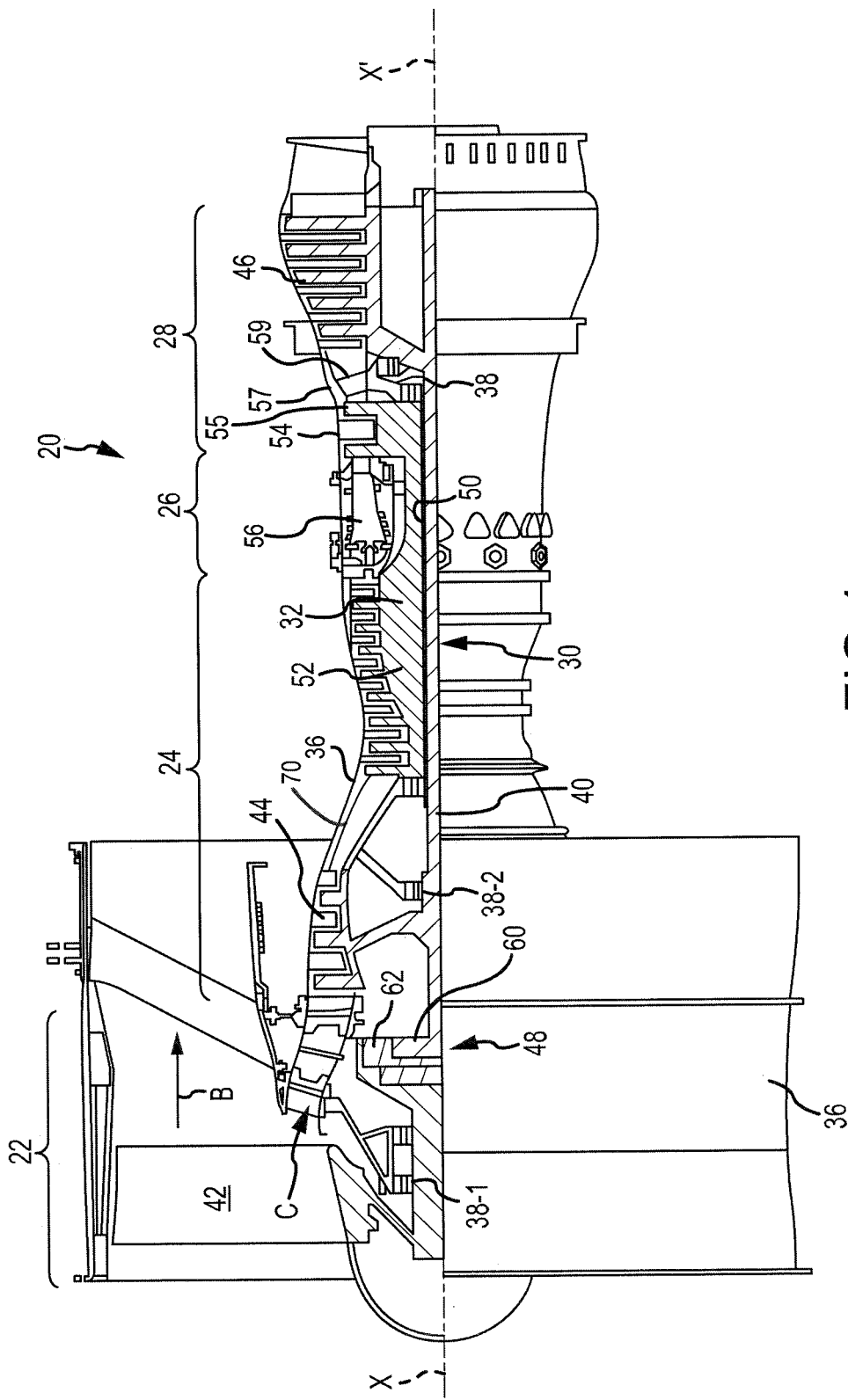
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. The mid-turbine frame 57 may support one or more bearing systems 38 in the turbine section 28. The inner shaft 40 and the outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 and the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6:1). In various embodiments, the bypass ratio of the gas turbine engine 20 may be greater than about ten (10:1). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3:1 and the low pressure turbine 46 may have a pressure ratio that is greater than about five (5:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis X-X'. The compressor and turbine sections 24, 28 may be referred to as rotor systems. Within the rotor systems of the gas turbine engine 20 are multiple rotor disks, which may include one or more cover plates or minidisks. Minidisks' may be configured to receive balancing weights or inserts for balancing the rotor systems.

In various embodiments, the gas turbine engine 20 may include a double-walled tube 70. The double-walled tube 70 may extend through a portion of at least one of the compressor section 24 or the turbine section 28. For example, the double-walled tube 70 may transport a fluid lubricant, such as oil, between various components of the gas turbine engine 20.

Figure 2A:
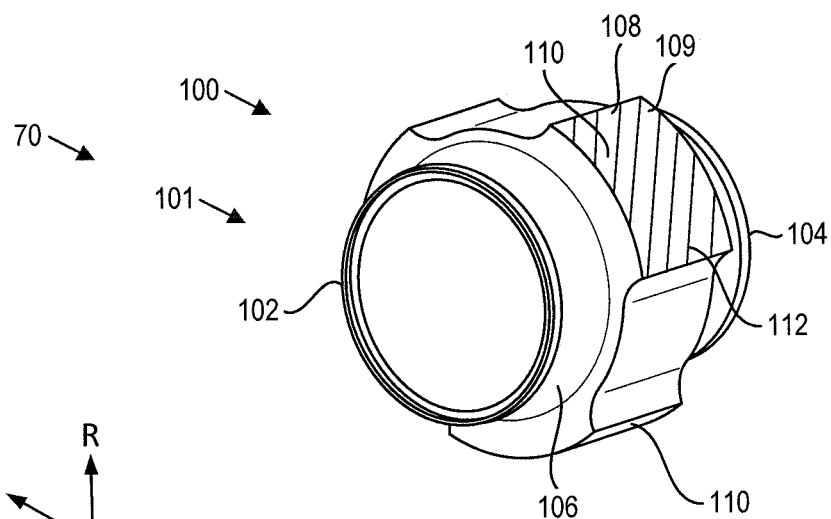
FIGS. 2A and 2B are perspective views illustrating an inner fitting and an outer fitting of a fitting for use in a double-walled tube, in accordance with various embodiments.
Figure 2B:
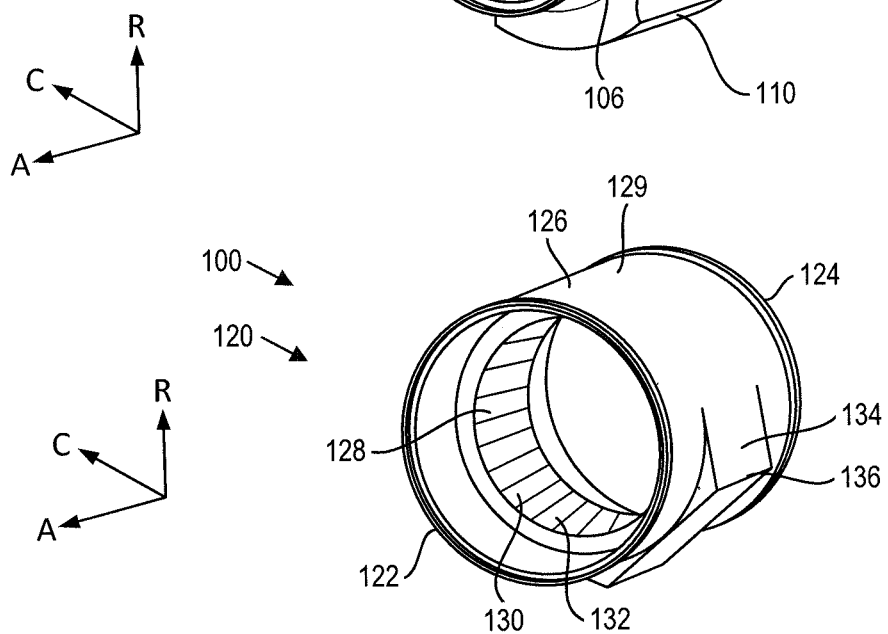

Turning to FIGS. 2A and 2B, the double-walled tube 70 may include a fitting 100. An A-R-C axis is shown throughout the drawings to illustrate the axial, radial, and circumferential directions, respectively, of the fitting 100.

The fitting 100 may include multiple pieces including an inner fitting 101 and an outer fitting 120. The inner fitting 101 may include a first inner weld lip 102, a second inner weld lip 104, and an inner body 106 extending from the first inner weld lip 102 to the second inner weld lip 104.

The inner fitting 101 may further include at least two bump-outs 108 extending outward from the inner body 106. Each of the at least two bump-outs 108 may include an outer surface 110 at an outer end 109 of the bump-outs 108 facing away from the inner body 106. The outer surface 110 of each of the bump-outs 108 may include a first threading 112. As shown in FIGS. 2A and 2B, the inner fitting 101 includes three bump-outs 108.

The outer fitting 120 may include a first outer weld lip 122, a second outer weld lip 124, and an outer body 126 extending from the first outer weld lip 122 to the second outer weld lip 124.

The outer fitting 120 may include an inward extending flange 130 extending radially inward from the outer body 126. The inward extending flange 130 may have an inner surface 128 facing away from the outer body 126. At least a portion of the inner surface 128 may include a second threading 132. In various embodiments, the entire inner surface 128 may include threading. Such a design may allow the outer fitting 120 to be placed in any position relative to the inner fitting 101, while also allowing the fitting to be installed from either direction.

The second threading 132 is designed to mate with the first threading 112 of the inner fitting 101. In that regard, the inner fitting 101 may be positioned inside of the outer fitting 120 and may be fastened to the outer fitting 120 via the first threading 112 and the second threading 132.

The outer fitting 120 includes an outer surface 129. The outer surface 129 may include an outward extending protrusion 134 extending radially outward therefrom. The outward extending protrusion 134 may have a shape that includes at least one angle 136. In that regard, the outward extending protrusion 134 may be designed to interface with a tool for fastening the outer fitting 120 to the inner fitting 101.

For example, the outward extending protrusion 134 may have a shape that corresponds to a portion of a hexagon. As shown, the outward extending protrusion 134 includes two sides of a hexagon. In that regard, a wrench (such as with a full or partial hex socket) may be positioned over the outward extending protrusion 134 and torqued to fasten the outer fitting 120 to the inner fitting 101.

The outer surface 129 may be designed without features at locations circumferentially opposite of the outward extending protrusion 134. In that regard, optional features may be added to the portions of the outer surface 129 circumferentially opposite of the outward extending protrusion 134. For example, the optional features may include a bolt hole, a mounting flange, or the like in order to mount the outer fitting 120 to a structure of the gas turbine engine 20 of FIG. 1.

Figure 2C:
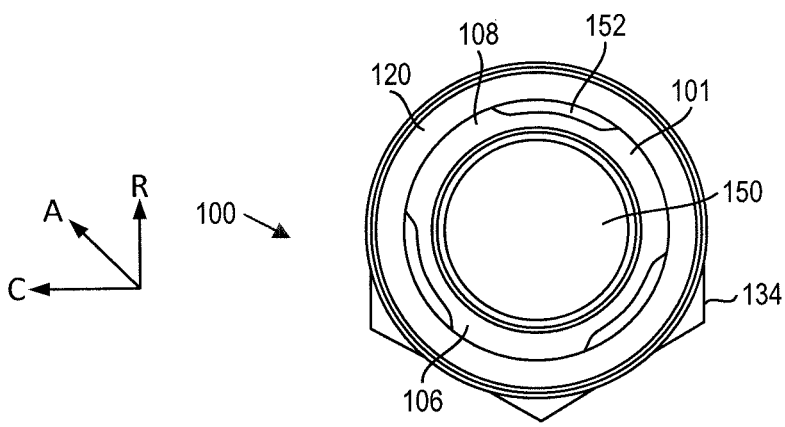
FIG. 2C is an axial view of the fitting of FIGS. 2A and 2B, in accordance with various embodiments.

Referring now to FIG. 2C, the fitting 100 is shown with the outer fitting 120 coupled to the inner fitting 101. As shown, the inner body 106 of the inner fitting 101 defines a main flow path 150 through which fluid may flow. In that regard, the main flow path 150 may transport a fluid, such as oil.

Additionally, one or more channel 152 may be defined between each of the bump-outs 108 and between the inner fitting 101 and the outer fitting 120. The channels 152 may receive and transport leakage fluid that has leaked from the main flow path 150.

Figure 3A:
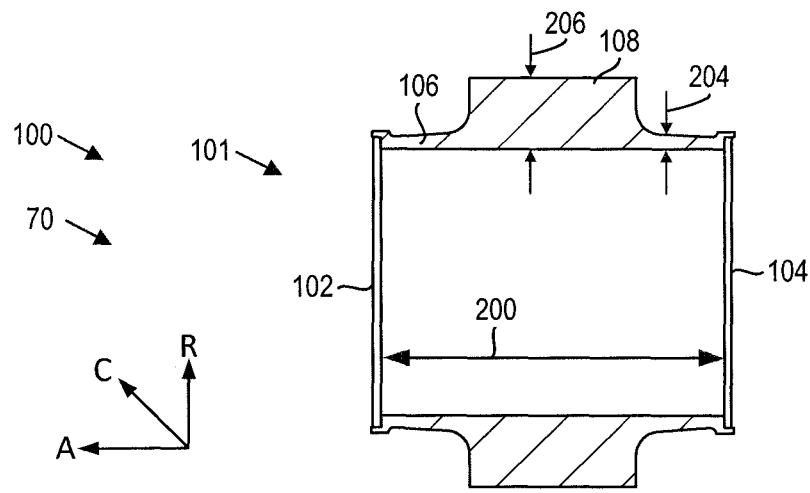
FIGS. 3A and 3B are cross-sectional views of the inner fitting and the outer fitting of FIGS. 2A and 2B, in accordance with various embodiments.
Figure 3B:
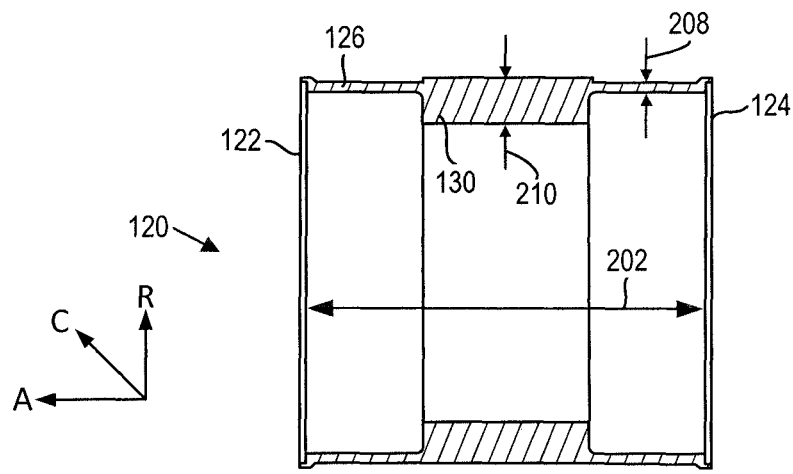

Referring to FIGS. 3A and 3B, cross-sectional views of the inner fitting 101 and the outer fitting 120 are shown. The inner fitting 101 has a length of the inner fitting 200 extending from the first inner weld lip 102 to the second inner weld lip 104. Likewise, the outer fitting 120 has a length of the outer fitting 202 extending from the first outer weld lip 122 to the second outer weld lip 124. In various embodiments, the length of the inner fitting 200 may be less than the length of the outer fitting 202.

After assembly of the double-walled tube 70, the weld joints may be inspected, such as via x-ray imaging. The weld joints are located at the first inner weld lip 102, the second inner weld lip 104, the first outer weld lip 122, and the second outer weld lip 124. Because the length of the inner fitting 200 is less than the length of the outer fitting 202, the first outer weld lip 122 and the second outer weld lip 124 may be examined via x-ray imaging without interference from the inner fitting 101.

The inner body 106 has an inner body thickness 204 at locations away from the bump-outs 108 and a bump-out thickness 206 at the bump-outs 108. As shown, the bump-out thickness 206 is greater than the inner body thickness 204.

Similarly, the outer body 126 has an outer body thickness 208 at locations away from the inward extending flange 130 and a flange thickness 210 at the inward extending flange 130. As shown, the flange thickness 210 is greater than the outer body thickness 208.

Figure 3C:
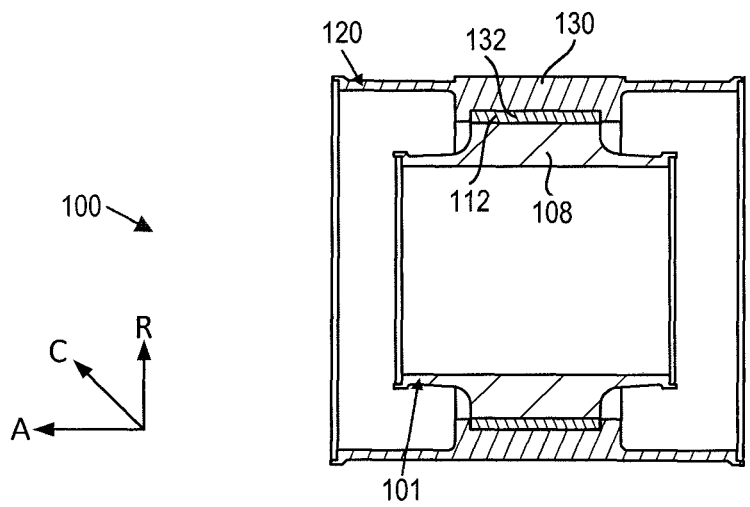
FIG. 3C is a cross-sectional view of the fitting of FIGS. 2A and 2B, in accordance with various embodiments.

Referring to FIG. 3C, the inner fitting 101 is fastened to the outer fitting 120. As shown, the first threading 112 located on the bump out 108 is designed to mate with the second threading 132 of the inward extending flange 130. In that regard, the inner fitting 101 may support the outer fitting 120.

Figure 4A:
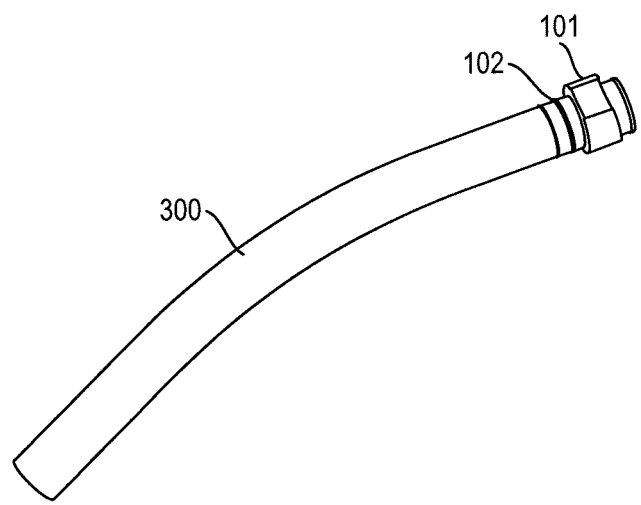
FIGS. 4A, 4B, 4C, 4D, 4E, and 4F illustrate a method of forming a double-walled tube using the fitting of FIGS. 2A and 2B, in accordance with various embodiments.

Referring to FIGS. 4A through 4F, a method for forming the double-walled tube 70 is shown. In FIG. 4A, a first inner tube 300 may be welded to the first inner weld lip 102 of the inner fitting 101. The first inner tube 300 may be welded to the first inner weld lip 102 using any welding technique. In various embodiments, the first inner weld lip 102 (and all other weld lips of the fitting 100 of FIG. 2A) may instead include threading or other means for fastening to the various tubes.

Figure 4B:
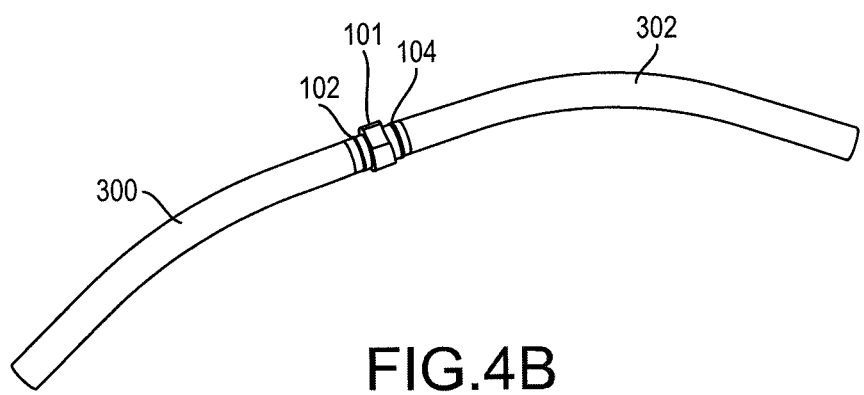

In FIG. 4B, a second inner tube 302 may be welded to the second inner weld lip 104 of the inner fitting 101.

Figure 4C:
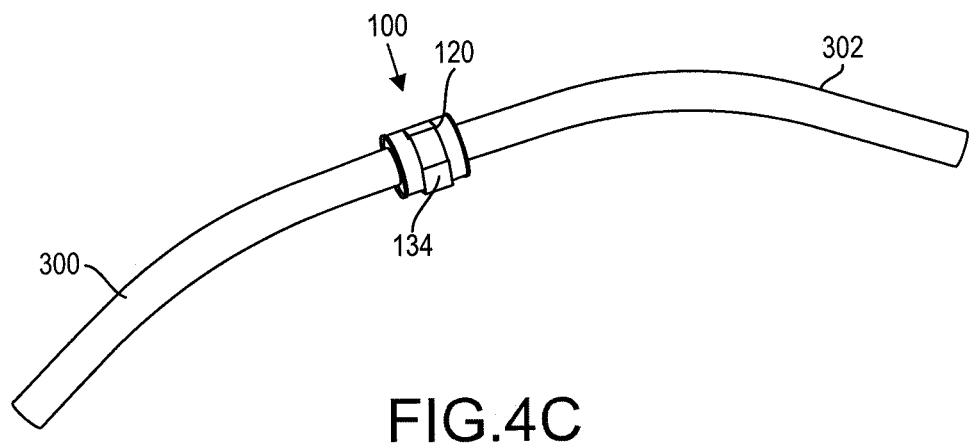

In FIG. 4C, the outer fitting 120 may be positioned over and fastened to the inner fitting 101. For example and with brief reference to FIGS. 2A and 4C, the outer fitting 120 may be positioned over the inner fitting 101 such that the first threading 112 contacts the second threading 132. At this point, the outer fitting 120 may be rotated relative to the inner fitting 101 (i.e., the outer fitting 120 may be torqued) until the first threading 112 is mated with the second threading 132. In order to facilitate this torqueing, a wrench having an interface that mates with the outward extending protrusion 134 may be used. For example, the wrench may have a hexagonal interface.

Figure 4D:
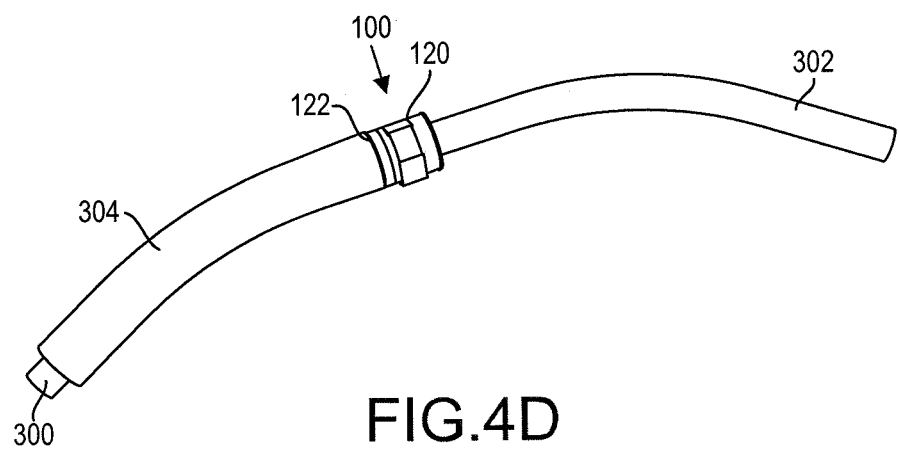

In FIG. 4D, a first outer tube 304 may be positioned over the first inner tube 300. The first outer tube 304 may then be welded to the first outer weld lip 122.

Figure 4E:
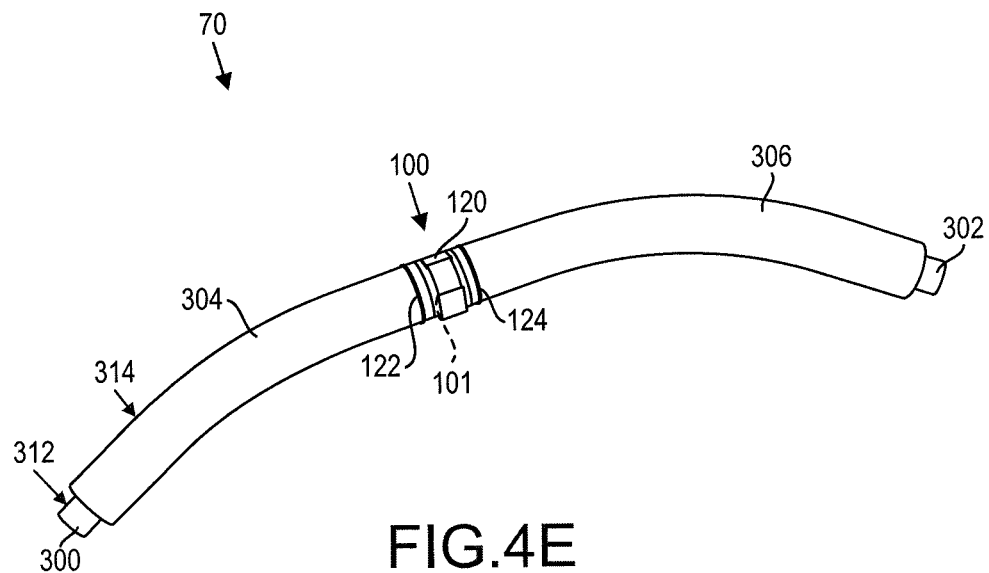

In FIG. 4E, a second outer tube 306 may be positioned over the second inner tube 302. The second outer tube 306 may then be welded to the second outer weld lip 124. In various embodiments, the double-walled tube 70 may be considered to be completed at this step. In that regard, the first inner tube 300, the second inner tube 302, and the inner fitting 101 may be regarded as the inner tube 312 of the double-walled tube 70. Likewise, the first outer tube 304, the second outer tube 306, and the outer fitting 120 may be regarded as the outer tube 314 of the double-walled tube 70.

Figure 4F:
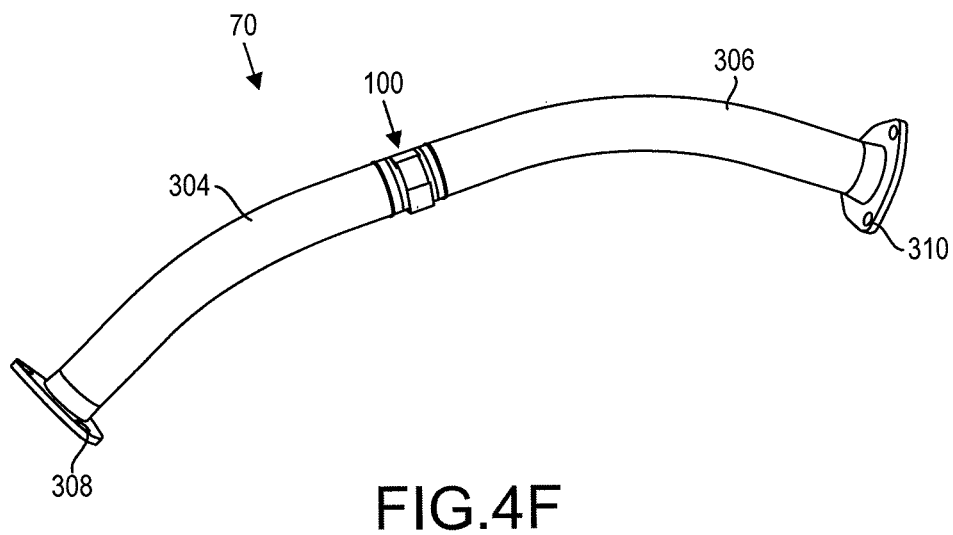

Referring to FIGS. 4E and 4F, it may be desirable to position fittings on the double-walled tube 70. In particular, a first fitting 308 may be coupled to one or both of the first inner tube 300 or the first outer tube 304. Likewise, a second fitting 310 may be coupled to one or both of the second inner tube 302 or the second outer tube 306. In various embodiments, the double-walled tube 70 may be considered to be completed at this step.

The fitting 100 may include any of a variety of materials. For example, the fitting 100 may include stainless steel, aluminum, titanium, an austenitic nickel-chromium-based alloy, such as a composition that by weight contains between 17% and 21% chromium, between 2.8% and 3.3% molybdenum, between 50% to 55% nickel, and between 4.75% and 5.5% niobium (available as INCONEL 718 from the Special Metals Corporation Huntington, W. Va., USA), or the like. It may be desirable for the material of the fitting 100 to be the same as the material of the inner tubes 300, 302 and the outer tubes 304, 306.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the Willis "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine, comprising:

a compressor section configured to compress air;

a combustor section configured to receive compressed air from the compressor section and fuel and ignite the compressed air and the fuel to generate exhaust;

a turbine section configured to convert the exhaust into torque; and a double-walled tube configured to transport fluid through at least a portion of at least one of the compressor section or the turbine section and having;

an inner tube having:

a first inner tube and a second inner tube, and an inner fitting having a first inner weld lip welded to the first inner tube, a second inner weld lip welded to the second inner tube, and an inner body extending from the first inner weld lip to the second inner weld lip and having an outer surface with a first threading; and an outer tube having:

a first outer tube and a second outer tube, and an outer fitting having a first outer weld lip welded to the first outer tube, a second outer weld lip welded to the second outer tube, and an outer body extending from the first outer weld lip to the second outer weld lip and having an inner surface with a second threading that is configured to mate with the first threading, wherein the inner fitting further includes at least two bump-outs extending outward from the inner body, and the outer surface with the first threading is positioned on an outer surface of the at least two bump-outs, wherein the first threading is positioned radially inward, relative to a longitudinal axis of the double-walled tube, from the first outer weld lip and the second outer weld lip.

2. The gas turbine engine of claim 1, wherein a channel is defined between the at least two bump-outs to allow the fluid to flow between the inner body and the outer body.

3. The gas turbine engine of claim 2, wherein the inner tube is configured to transport the fluid and the channel is configured to allow leakage fluid from the inner tube to pass between the inner fitting and the outer fitting.

4. The gas turbine engine of claim 1, wherein the outer fitting further includes an outward-extending protrusion having a shape that corresponds to a portion of a hexagon and is configured to interface with a wrench for fastening the outer fitting to the inner fitting.

5. The gas turbine engine of claim 1, wherein a length of the inner fitting from the first inner weld lip to the second inner weld lip is less than a length of the outer fitting from the first outer weld lip to the second outer weld lip.

* * * * *